US010925303B2

(12) United States Patent
Kaji et al.

(10) Patent No.: US 10,925,303 B2
(45) Date of Patent: Feb. 23, 2021

(54) PROCESS FOR MAKING A SWEETENED OR CARAMELIZED ALLIUM BASED FLAVORING PRODUCT

(71) Applicant: Sensient Natural Ingredients LLC, Turlock, CA (US)

(72) Inventors: Bradley Katsu Kaji, Livingston, CA (US); Daniel Jeffrey Brotslaw, Modesto, CA (US)

(73) Assignee: SENSIENT NATURAL INGREDIENTS LLC, Turlock, CA (US)

( * ) Notice: Subject to any disclaimer, the term of this patent is extended or adjusted under 35 U.S.C. 154(b) by 292 days.

(21) Appl. No.: 15/299,783

(22) Filed: Oct. 21, 2016

(65) Prior Publication Data

US 2017/0112174 A1 Apr. 27, 2017

Related U.S. Application Data

(60) Provisional application No. 62/244,833, filed on Oct. 22, 2015.

(51) Int. Cl.
*A23L 27/16* (2016.01)
*A23L 27/10* (2016.01)
*A23L 5/20* (2016.01)

(52) U.S. Cl.
CPC ............... *A23L 27/16* (2016.08); *A23L 5/23* (2016.08); *A23L 27/105* (2016.08); *A23L 27/11* (2016.08); *A23V 2002/00* (2013.01)

(58) Field of Classification Search
CPC . A23L 27/16; A23L 27/11; A23L 5/23; A23L 27/105; A23V 2002/00
USPC ............... 426/650, 534, 535, 615, 638, 520
See application file for complete search history.

(56) References Cited

U.S. PATENT DOCUMENTS

| | | | |
|---|---|---|---|
| 3,424,592 | A | 1/1969 | Huth |
| 3,645,756 | A | 2/1972 | Huth |
| 4,394,394 | A | 7/1983 | Nava et al. |
| 6,730,345 | B2 | 5/2004 | Khairullah et al. |
| 8,647,698 | B2 | 2/2014 | Kusano et al. |
| 2007/0016984 | A1 | 1/2007 | Hendricks |
| 2011/0041217 | A1 | 2/2011 | Watson |
| 2015/0056359 | A1 | 2/2015 | Jensen et al. |

FOREIGN PATENT DOCUMENTS

| | | |
|---|---|---|
| GB | 2185672 A | 7/1987 |
| WO | 9742333 A1 | 11/1997 |
| WO | 2004084653 A1 | 10/2004 |

OTHER PUBLICATIONS

Algadi, et al. "Physicochemical Properties of Garlic (*Allium sativum*) Paste Treated with Ascorbic and Citric Acids"; International Journal of Science, Environment and Technology, vol. 3, No. 6, 2014, pp. 1932-1942, dated Dec. 2, 2014.
Corzo-Martinez, et al. "Biological properties of onions and garlic"; Trends in Food Science & Technology, vol. 18, pp. 609-625, dated 2007, Elsevier Ltd.
Darbyshire, et al. "The Association of Fructans with High Percentage Dry Weight in Onion Cultivars Suitable for Dehydrating"; J. Sci. Food Agric. vol. 30, pp. 1035-1038, dated 1979.
Darbyshire, et al. "Differences in Fructan Content and Synthesis in some *Allium* Species"; New Phytol. vol. 87, pp. 249-256, dated 1981.
Delwiche, et al. "Soluble Solids and Simple Sugars Measurement in Intact Mango Using Near Infrared Spectroscopy"; HortTechnology dated Jul.-Sep. 2008 18(3).
Echeverria, E. "Brix and Acid Determinations"; Quality Control Assessment Methodology, Short Course Proceedings at Citrus Research and Education Center, pp. 65-75, dated Sep. 5, 1990.
Galmarini, et al. "Genetic analyses of correlated solids, flavor, and health-enhancing traits in onion (*Allium cepa* L.)"; Mol Genet Genomics (2001) 265: 543-551; published Mar. 8, 2001.
Kleinhenz, et al. "Using Brix as an Indicator of Vegetable Quality"; The Ohio State University Extension—Fact Sheet Agriculture and Natural Resources HYG-1650-12 pp. 1-4, dated 2012.
Lin, et al. "Inheritance of Soluble Solids and Pyruvic Acid Content of Bulb Onions"; J. Amer. Soc. Hort. Sci 120(1) pp. 119-122, dated 1995.
Lund, et al. "Onion Dehydration"; Geo-Heat Center, Oregon Institute of Technology, Klamath Falls, OR, 2000.
Mitra, et al. "Onion dehydration: a review"; Journal of Food Science and Technology, 49(3): 267-277; dated Jun. 2012.
McClearly, et al. "Measurement of Total Fructan in Foods by Enzymatic/Spectrophotometric Method: Collaborative Study"; Journal of AOAC International vol. 83, No. 2, pp. 356-364, dated 2000.
Kahane, et al. "Changes in non-structural carbohydrate composition during bulbing in sweet and high-solid onions in field experiments"; Environmental and Experimental Botany vol. 45, pp. 73-83, dated 2001.
Muir, et al. "Fructan and Free Fructose Content of Common Australian Vegetables and Fruit"; Journal of Agricultural and Food Chemistry vol. 55, pp. 6619-6627, dated 2007.
Shepherd, et al. "Fructose Malabsorption and Symptoms of Irritable Bowel Syndrome: Guidelines for Effective Dietary Management"; Journal of the American Dietetic Association vol. 106, No. 10, pp. 1631-1639, dated Oct. 2006.
Megazyme. "D-Fructose and D-Glucose Assay Procedure"; K-FRUGL Sep. 2013; www.megazyme.com, Megazyme International Ireland pp. 1-19, dated 2013.
Megazyme. "Fructan Assay Procedure for the measurement of Fructo-oligosaccharides (FOS) and Fructan Polysaccharide"; K-FRUC Mar. 2014; www.megazyme.com, Megazyme International Ireland Limited, pp. 1-11, dated 2014.
Olam. "Dehydrated Vegetables"; www.olamonline.com, dated 2011.
SelfNutritionData. "Nutrition Facts and Analysis for Caramelized Onions"; http://nutritiondata.self.com/facts/recipe/2494619/2, pp. 1-3, date accessed: May 20, 2015.

(Continued)

*Primary Examiner* — Leslie A Wong
(74) *Attorney, Agent, or Firm* — Husch Blackwell LLP

(57) ABSTRACT

A sweetened, non-fat *Allium*-based flavoring material, which can be caramelized, compositions comprising the flavoring material, and processes to produce the flavoring material.

18 Claims, 1 Drawing Sheet

(56) References Cited

OTHER PUBLICATIONS

Food-Info. "Caramelization"; http://www.food-info.net/uk/colour/caramel.htm, pp. 1-3, date accessed: Jun. 10, 2015.
Food-Info. "Fructans"; http://www.food-info.net/uk/carbs/fructans.htm, pp. 1-4, date accessed: Jun. 16, 2015.
National Onion Labs, Inc. "Analytical Services"; http://www.onionlabs.com/analytical-services, pp. 1-3, date accessed: Jun. 22, 2015.
Wikipedia. "Caramelization"; http://en.wikipedia.org/wiki/Carmelization, pp. 1-2, date accessed: Jun. 10, 2015.
Essential Medicines and Health Products Information Portal "WHO Monographs on Selected Medicinal Plants"; vol. 1, 1999, pp. 1-9, http://apps.who.int/medicinedocs/en/d/Js2200e/3.html, date accessed Sep. 23, 2015.
Healthy Julie. "How to Caramelize Onions Without Oil"; https://healthyjulie.com/how-to-caramelize-onions-without-oil/, dated Feb. 5, 2015.
International Search Report and Written Opinion for International Application No. PCT/US2016/058090 dated Jan. 25, 2017.

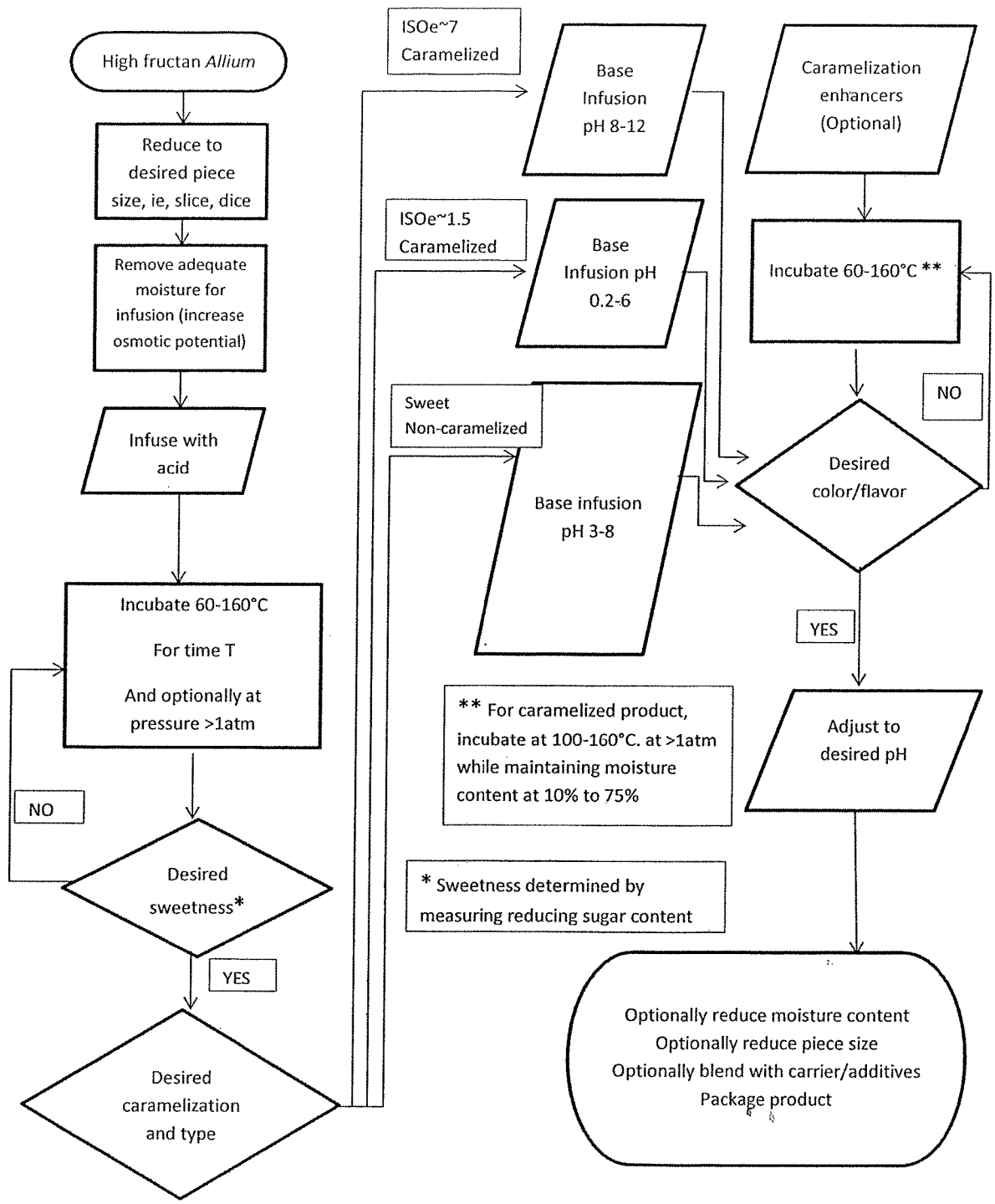

PROCESS FOR MAKING A SWEETENED OR CARAMELIZED ALLIUM BASED FLAVORING PRODUCT

FIELD OF THE INVENTION

Various embodiments of the present invention relate to an uncaramelized or caramelized, sweetened, non-fat *Allium*-based flavoring material, compositions comprising the flavoring material, and processes for preparing the flavoring material and compositions.

BACKGROUND OF THE INVENTION

A dehydrated onion produced from a high soluble solids content onion typically has a low content of mouth appealing sweet sugars (i.e., glucose, fructose and sucrose). During the growing and bulb maturation process, a high solids onion converts simple sugars into long-chain polymerized sugars called fructans (as opposed to starch in most plant commodities).

Fructans are linear and branched polymers of fructose. The fructans in varieties of the onion family (*Allium* genus) are mostly oligosaccharides and polysaccharides of fructose with a single glucose unit (i.e. a glucose-fructose disaccharide) at a terminal end. The number of linked fructose units, plus the single glucose unit gives the degree of polymerization (DP) of the fructan.

Fructans are generally stable and flavorless. Dehydrated onions typically have a very pungent, intense flavor which is desirable for many applications. However, for certain applications, a sweeter or caramelized-type flavor is desirable.

Caramelization is typically obtained by slowly sautéing size reduced (e.g., sliced) onions on a stovetop with the addition of a fat or oil and often sugar. The caramelization process is slow and inefficient, and the resulting product has a high fat content.

It would, therefore, be desirable to provide a shelf-stable, onion flavoring material having a sweetened form or a caramelized onion flavoring material, without the addition of any fats or oils or sweeteners. It would also be desirable to provide such an onion flavoring material as a dehydrated material, which, when rehydrated, retains and is substantially similar to the piece size or form of the dehydrated material (e.g., similar sized pieces, similar pureed form, etc.). These needs and others have been met by the following invention.

SUMMARY OF THE INVENTION

In one aspect, the invention provides a process for preparing a non-fat, sweetened *Allium* flavoring material. In an embodiment, the process comprises:

a) Reducing a moisture content of an *Allium* material having a high soluble solids content (SSC) of at least 8% to a residual moisture content of less than 50%;

b) Contacting the reduced moisture *Allium* material with an acid component at a temperature of 60 to 160° C. to produce an acid-processed *Allium* material having a desired amount of sweetness;

c) Contacting the acid-processed *Allium* material with a basic compound to produce the *Allium* flavoring material having a desired color and flavor; and d) Optionally adjusting the *Allium* flavoring material to a pH of 3 to 8, preferably 6 to 7.5;

wherein
the *Allium* material is processed without the addition of a fat or oil material or component; and
the processed *Allium* flavoring material has an increased concentration of glucose and fructose compared to the same *Allium* material which is not processed according to steps a, b and c.

In an embodiment, the processed *Allium* flavoring material is produced without the addition of a sweetening agent or sugar.

In an embodiment, the step c) base processing is conducted to produce an uncaramelized, sweetened, non-fat *Allium* flavoring material. In one embodiment, the uncaramelized *Allium* flavoring material has a pH of 3 to 8, or 6 to 8. The color of the uncaramelized *Allium* flavoring material can vary according to the color of the source *Allium* material. In an embodiment, the uncaramelized *Allium* flavoring material is light golden to dark golden in color.

In an embodiment, the step c) base processing is conducted to produce a caramelized, non-fat, sweetened *Allium* flavoring material. The caramelized *Allium* flavoring material has the organoleptic characteristics associated with caramelized products (e.g., onions). In embodiments, the step c) base processing is conducted by incubating the *Allium* material with the base compound, optionally under pressure at a temperature of 60 to 160° C. to produce the caramelized *Allium* flavoring material. In one embodiment, the step c) base processing is conducted to infuse the basic compound into the *Allium* material to a pH of 8 to 12, or preferably to a pH of 9 to 10, to produce a caramelized material. In another embodiment, the step c) base processing is conducted to infuse the basic compound into the *Allium* material to a pH of 0.2 to 6, or preferably to a pH of 3 to 5, to produce a caramelized material.

In another aspect, the invention provides a composition comprising an uncaramelized or caramelized *Allium*-based flavoring material, as prepared according to the invention.

In an embodiment, the composition comprises a processed, non-fat, sweetened, uncaramelized *Allium*-based flavoring material in combination with a carrier or filler and optional additive(s), and no component or ingredient that is or contains fat.

In an embodiment, the composition comprises a caramelized, processed, non-fat, sweetened *Allium*-based flavoring material in combination with a carrier or filler, and optional additive(s), and no component or ingredient that is or contains fat.

In an embodiment, the composition comprises:
(A) 80 to 99.5 wt % of a non-fat, sweetened *Allium*-based flavoring material processed as disclosed herein without the addition of a fat or oil component;
(B) 0.5 to 20 wt % of a carrier or filler; and
(C) 0 to 10 wt % of one or more additives.
In embodiments, the component (A) *Allium*-based flavoring material is caramelized.

BRIEF DESCRIPTION OF THE DRAWINGS

Embodiments of the present invention are illustrated by way of example and are not limited by the accompanying FIGURES.

FIG. 1 is a flowchart illustrating a process flow for producing an uncaramelized and a caramelized non-fat, sweetened *Allium* flavoring material according to an embodiment of the invention, given by way of example.

DETAILED DESCRIPTION OF THE INVENTION

The present invention provides a process to efficiently process dehydrated (or moisture reduced) onions, garlic and other *Allium* plant materials, into a shelf stable sweetened form (or caramelized form) without the addition of any fats or oils. In one embodiment, the *Allium*-based flavoring material is prepared without the addition of sugar or sweetening agents.

The present process uses acid hydrolysis and heat to reconvert fructans of an *Allium* plant material to the sweeter simple sugars (e.g., sucrose, fructose, glucose). After a sufficient reaction time, the hydrolysis process is terminated by the addition of a base neutralizing compound.

In an embodiment to produce a caramelized *Allium* flavoring material, the base neutralizing compound is infused into the acid processed plant material to a pH of 0.2 to 6 or a pH of 8 to 12.

In an embodiment, the base neutralizing compound is infused into the acid processed plant material, which is then subjected to a temperature ranging from 60° C. to 160° C. followed by sufficient incubation time to achieve desired organoleptic caramelized properties.

In another embodiment, the base neutralizing compound is infused into the acid processed plant material, which is then subjected to high pressure (e.g., >1 atm) and a temperature from 60° C. to 160° C., while maintaining a product moisture content at 10 to 75%, or 15 to 40%, or 20 to 30%, to enable the development of the caramelized color and flavor profiles.

In embodiments, for the acid hydrolysis step and/or the base neutralizing step, the plant material can be processed using an autoclave, a retort apparatus, a moisture recirculating oven, or other pressurized processing device.

In some embodiments, after the base neutralizing step, the pH of the *Allium* material can be adjusted to a pH of 3 to 8.

In an embodiment, the base neutralized material (either uncaramelized or caramelized) can then be dehydrated to reduce the residual moisture to a storage or shelf stable level, and packaged. In another embodiment, the base neutralized material (either uncaramelized or caramelized) can be packaged without being dehydrated. In an embodiment, the dried *Allium*-based can be milled to a reduced piece size or powder.

Definitions

Unless stated to the contrary, implicit from the context, or customary in the art, all parts and percents are based on weight, and all test methods are current as of the filing date of this disclosure.

For purposes of United States patent practice, the contents of any referenced patent, patent application or publication are incorporated by reference in their entirety (or its equivalent US version is so incorporated by reference) especially with respect to the disclosure of synthetic techniques, product and processing designs, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, weight percentages, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 0.9, 1.1, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts of various components in the inventive composition, and the various characteristics and properties by which these compositions and the optical cable protective components made from these compositions are defined.

"*Allium*" and like terms, as used herein, refer to plants of the genus *Allium*, including, but not limited to, onions, garlic, chives, scallions, shallots, and leeks.

"*Allium* material", "*Allium*-derived material" or "*Allium*-based material," and like terms, as used herein, refer to a material obtained or processed from an *Allium* plant.

"*Allium* flavoring material," and "*Allium* flavoring product" as used herein, refer to a flavoring or product produced from an *Allium* material.

"Composition" and like terms, as used herein, mean a mixture or blend of two or more components which comprise the composition, as well as reaction products formed from the components of the composition.

"Comprising," "including," "having," and their derivatives, are not intended to exclude the presence of any additional component, step or procedure, whether or not the same is specifically disclosed. In order to avoid any doubt, all compositions and processes claimed through use of the term "comprising" may include any additional component, step or procedure, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Process

In one embodiment, the invention is a process for preparing a non-fat, sweetened *Allium* flavoring material by processing an *Allium* material. The *Allium* material is processed without the addition of a fat or oil material or component.

FIG. 1 is a flowchart illustrating an embodiment of a process flow for producing an uncaramelized and a caramelized non-fat, sweetened *Allium* flavoring material according to an embodiment of the invention.

*Allium* Starting Material

In embodiments, the *Allium* material is derived from a plant material of a suitable *Allium* species, including, but not limited to, *Allium cepa* (onion), *Allium sativum* (garlic), *Allium ampeloprasum* (leeks), *Allium cepa* var. *aggregatum* (shallots), *Allium schoenoprasum* (chives) and *Allium fistolusum* (Japanese bunching onion).

The plant source material can be in the form, for example, of bulbs, cloves, leaf sheaths, and scapes, among other forms.

In embodiments, the starting material is a plant material derived from an *Allium* variety having a high fructan content and a high soluble solids content (SSC).

In general, the higher the percentage dry matter content (% dry weight), the higher the soluble solids content, the fructan content, and the mean degree of polymerization (DP) of the fructans in the bulbs.

High fructan levels in onions are typically found in onion varieties that are bred for use in dehydration and have a high soluble solids content. Onions bred for fresh market applications are generally much lower in soluble solids and contain relatively low levels of fructans. The soluble solids content of onion bulbs can vary from as low as 5% for immature fresh market cultivars up to greater than 27% for cultivars bred specifically for dehydration.

Conversely, garlic cultivars tend to be interchangeable between the fresh market and dehydration industry, with both types having a high fructan content. The soluble solids content of garlic bulbs typically ranges from 32 to 50% with a fructan content ranging from 45% to 68% (on a g/100 g dry wt. basis) including only a minor content (<5%) of low molecular weight fructans, and a low fructose, sucrose and glucose content.

Percentage dry weight (dry matter content). For the production of dried *Allium* products, a high dry matter content (high % dry weight) of the starting *Allium* material is desired in order to reduce the energy required to evaporate water per unit of dried material.

Total dry weight (or dry matter), expressed as a percent dry weight (% dry wt.) can be measured, for example, by drying samples of a known weight in a forced air vacuum oven.

In embodiments, the starting *Allium* plant material can have a percent dry weight (% dry wt) of at least 15%, and preferably at least 20% or higher, up to 55%.

In embodiments, the % dry weight of an onion plant material can range from 15% to up to 30%. In embodiments, the % dry weight of a garlic plant material can range from 32% to up to 55%.

Soluble solids content (SSC). Soluble solids or soluble solids content (SSC) is the percentage (%) of glucose, sucrose, fructose and fructans, in a plant material as measured by a refractometer. Soluble solids content (SSC) of the *Allium* material can be measured by refractive index according to the method of Mann and Hoyle, 1945 (*Proc. Americ. Soc. Hort. Sci.* 46: 285-292) or Foskett and Peterson, 1949 (*Proc. Americ. Soc. Hort. Sci.* 55: 314-318).

In embodiments, the *Allium* plant material can have a soluble solids content (SSC) that ranges from 10% to 50%. In embodiments, the preferred *Allium* plant material has a soluble solids content (SSC) of 15 to 50%.

In embodiments, the soluble solids content of an onion plant can be at least 13%. or at least 14%, or at least 19%, up to 25%, or up to 18%, or, for certain onion varieties (e.g., cultivars grown for dehydration) of up to 27% or greater. In embodiments, the soluble solids content of an onion plant can range from 13% to 27% or greater, or from 14% to 25%, or from 19% to 25%. In embodiments, the soluble solids content of a garlic plant material can be 30% or greater, or up to 45% or greater.

Fructan content. Fructan content or total fructans, expressed as g/100 g material analyzed, can be measured, for example, by means of an enzyme assay kit using the Megazyme Fructan Assay Procedure for the measurement of fructo-oligosaccharides (FOS) and fructan polysaccharide (AOAC Method 999.03 and AACC Method 32.32; Megazyme International Ireland Ltd., 2014) at http://secure.megazyme.com/filesBooklet/K-FRUC_DATA.pdf. In brief, a dried sample is milled or ground to around 0.5 mm particle size. The sample is extracted with hot water, filtered, and an aliquot of the solution is processed with a mixture of sucrose, α-amylase, pullulanase, and maltase to hydrolyze sucrose to glucose and fructose, and starch to glucose. These reducing sugars are then reduced to sugar alcohols by processing with an alkaline borohydride solution. The solution is then neutralized, and excess borohydride is removed with dilute acetic acid. The fructan is then hydrolyzed to fructose and glucose using a fructanase mixture of purified exo and endo-inulinanases. The reducing sugars produced (fructose and glucose) are then reacted with para-hydroxybenzoic acid hydrazide, and the absorbance of the solution is measured with a spectrophotometer at 410 nm. The fructan content is then calculated based on the difference between the sample absorbance and the sample blank absorbance.

Fructose and Glucose Content. D-Glucose and D-Fructose (reducing sugar) content, expressed as g/L material analyzed, can be measured, for example, by means of an enzyme assay kit using the Megazyme D-Fructose and D-Glucose Assay Procedure for the measurement of the D-glucose and D-fructose content, and the content of total reducing sugars (D-glucose plus D-fructose) (Megazyme International Ireland Ltd., 2014) at https://secure.megazyme.com/filesBooklet/K-FRUGL_DATA.pdf. Testing can be performed by means of an assay kit using a manual format, an auto-analyzer format, or a microplate format. For example, in a manual assay procedure, in brief, a dried plant sample is milled or ground to around a 0.5 mm particle size. The sample is extracted with water (heated to 60° C., if necessary), filtered, and an aliquot of the filtered solution is combined with water, buffer and a nicotinamide-adenine dinucleotide phosphate plus adenosine-5'-triphosphate ($NADP^+/ATP$) solution, and the absorbance of the solution $A_1$ is read using a spectrophotometer at 340 nm. The solution ($A_1$) is then reacted with a hexokinase plus glucose-6-phosphate dehydrogenase (HK/G6P-DH) suspension to phosphorylate the D-glucose and D-fructose to form glucose-6-phosphate (G-6-P) and fructose-6-phosphate (F-6-P), and oxidize t the G-6-P by $NADP^+$ to gluconate-6-phosphate plus NADPH. The absorbance of the solution ($A_2$) is then read at 340 nm until static over two minutes to determine the amount of NADPH, which is stoichiometric with the amount of D-glucose. A phosphoglucose isomerase (PGI) suspension is then mixed in to convert the fructose-6-phosphate to glucose-6-phosphate, which in turn reacts with $NADP^+$ to form gluconate-6-phosphate and NADPH. The absorbance of the solution ($A_3$) is read at 340 nm to determine the amount of NADPH, which is stoichiometric with the amount of D-fructose. The content (g/100 g) of D-glucose and D-fructose of the sample is then calculated based on the absorbance differences ($A_2-A_1$; $A_3-A_2$) for both the samples and the blank.

In another embodiment, the concentration of the sum of D-glucose plus D-fructose (i.e., total reducing sugars) can be determined using a Megazyme D-Fructose and D-Glucose Assay Procedure. In brief, the determination can be conducted by combining an aliquot of the sample solution with water, buffer and $NADP^+/ADP$ solution, and reading the absorption of the solution ($A_1$), then reacting the $A_1$ solution with an HK/G6P-DH/PGI suspension, and reading the absorption of the solution ($A_{TOTAL}$). The content of total reducing sugars (D-glucose+D-fructose) can then be calculated based on the absorbance difference ($A_{TOTAL}-A_1$) for both the sample and the blank.

In embodiments, the fructan content of an onion plant material can be 8% or greater, more typically 15% or greater, up to 25% for dehydrator onions. In embodiments, the fructan content of a garlic plant material can be 20% or greater, more typically 25% or greater, up to 35% (fresh wt. basis).

Processing
Cleaning

In embodiments, the starting *Allium* plant material can be cleaned (e.g., by washing) and unwanted parts (e.g., skin, roots, leaves, stems, tops, etc.) can be removed and discarded.

Size Reduction

In embodiments, the starting *Allium* plant material is chopped, sliced, diced or otherwise subdivided to reduce the size of the material into pieces or fragments. Any of a variety of cutting or slicing devices can be used. Preferred sizes of the plant material include ⅛" (about 3 mm) thick slices or diced pieces of ¼" or ½" (about 6 to 13 mm) diameter.

Moisture Content Reduction

In embodiments, the starting *Allium* plant material is processed by partial or complete dehydration, to reduce the initial moisture content of the material to a residual moisture level of less than 50%. Initial moisture of an onion material generally ranges from 73% for an elite dehydrator onion to up to 95% for an immature sweet onion. For garlic, initial moisture typically ranges from 55 to 70%. Preferably, the starting plant material is not completely dried and retains a minimal residual amount of moisture of at least 4%.

Any of a variety of dehydrating devices can be used to reduce the moisture content of the plant material. For example, the *Allium* material can be dehydrated using a forced air dryer, fluidized bed dryer, microwave, freeze dryer, infrared dryer, drum, or vacuum dryer, among others. In embodiments, drying can be done in stages whereby factors such as the temperature, humidity, air velocity and conveyor rate are controlled according to the moisture content of the plant material.

Moisture content of the *Allium* material, expressed as % moisture, can be determined by means of a moisture analyzer, commercially available, for example, from Mettler-Toledo International Inc., Columbus, Ohio.

Acid Processing

In embodiments, the reduced moisture *Allium* material is contacted with an acid component to hydrolyze at least a portion of the fructan content to simple sugars (e.g., sucrose, glucose and fructose).

In an embodiment, the acid processing is conducted at an elevated temperature of 60 to 160° C.

In an embodiment, the acid component is applied as an aqueous solution. In another embodiment, the acid component is applied in a gaseous phase.

In an embodiment, an acid component can be applied to the *Allium* material, and the material heated (e.g., incubated) to a temperature of 60 to 160° C. under pressure (e.g., >1 atm), while maintaining the moisture content of the material at 10 to 75%, or 15 to 40%, or 20 to 30%.

In embodiments, the plant material can be processed using an autoclave, a retort apparatus, a moisture recirculating oven, or other pressurized processing device.

In an embodiment, the acid component is an aqueous solution of an inorganic acid. Examples of suitable inorganic acids include, but are not limited to, sulfuric acid, hydrochloric acid, phosphoric acid, and nitric acid. In an embodiment, the acid component is a dilute aqueous solution, for example, a 1% aqueous solution (0.33% w/w) of sulfuric acid.

In an embodiment, the acid component is an aqueous solution of an organic acid. Examples of suitable organic acids include, but are not limited to, citric acid, acetic acid, formic acid, propionic acid, butyric acid, valeric acid, caproic acid, lactic acid, malic acid, benzoic acid and carbonic acid.

Preferred acids include sulfuric acid, hydrochloric acid, phosphoric acid, and nitric acid.

In an embodiment, the percent (%) of fructan and simple sugars (fructose, glucose) in the acid-processed *Allium* material can be determined and compared to the contents of the starting *Allium* material before the acid processing. For example, in an embodiment, the fructan content of the *Allium* material, before and after the acid processing, can be determined by means of a Megazyme Fructan Assay kit (commercially available from Megazyme International Ireland Ltd.), as described herein, whereby the simple sugars are first removed and the fructan content then measured. In embodiments, reduced fructan content in the acid-processed *Allium* material (compared to the starting plant material before the acid processing) would equate to an increased level of simple sugars in the acid-processed material versus the un-processed material.

In another embodiment, the D-fructose and D-glucose content of the *Allium* processed material and unprocessed, starting material can be determined and compared by means of a Megazyme D-fructose and D-glucose Assay Kit (commercially available from Megazyme International Ireland Ltd.), as described herein. An increased level of D-fructose and/or D-glucose in the acid-processed *Allium* material (compared to the starter material before the acid processing) would confirm the effectiveness of the acid processing of the *Allium* material to hydrolyze fructan to increase the content of simple sugars.

In embodiments, the acid processing of the *Allium* material converts (hydrolyzes) a majority (e.g., >50%) of the fructan content of the starting *Allium* material to simple sugars.

In an embodiment, the fructan content of the acid-processed *Allium* material is at least 20% lower, or at least 30% lower, or at least 40% lower, or at least 50% lower, and preferably at least 60% lower, up to 100% lower, or up to 90% lower, or up to 80% lower, or up to 70% lower, than the fructan content of the unprocessed, starting *Allium* material.

Base Processing

After a sufficient reaction time, the fructan hydrolysis process is terminated by the addition of a base neutralizing compound. FIG. 1 illustrates multiple pathways of producing a finished *Allium* flavoring material. As illustrated in FIG. 1, the combination of incubation time with the base chemical, temperature, and optionally added caramelization enhancers, leads to a finished product having the desired color and flavor.

Non-caramelized product. To produce a non-caramelized *Allium* flavoring material, in an embodiment, the acid-processed *Allium* material is contacted with a dilute, aqueous solution of a base chemical. In an embodiment, a room temperature solution of the base chemical (e.g., 15° C. to 30° C.) is infused into the acid-processed *Allium* material. In an embodiment, a heated (e.g., 60 to 160° C.), dilute, aqueous solution of a base chemical is infused into the acid-processed *Allium* material. In an embodiment the base chemical is infused into the acid-processed *Allium* material to a pH of 3 to 8, or a pH of 6 to 8, to produce an uncaramelized *Allium* flavoring material. In one embodiment, the uncaramelized *Allium* flavoring material is light golden to dark golden in color. The resulting *Allium* material is a non-fat, sweetened *Allium* flavoring material which has an increased level of sweetness (i.e., simple sugars) compared to the non-processed, starting *Allium* material.

Caramelized product. To produce a caramelized *Allium* flavoring material, in an embodiment, the acid-processed *Allium* material is contacted with a dilute, aqueous solution of a base chemical at an elevated temperature ranging from 60 to 160° C., while maintaining the moisture content of the material at 10 to 75%, or 15 to 40%, or 20 to 30%, under pressure (e.g., >1 atm). In an embodiment, a room temperature 15° C. to 30° C. aqueous solution of a base chemical is infused into the *Allium* material, and the material is heated (e.g., incubated) to a temperature of 60 to 160° C., while maintaining the moisture content of the plant material at 10 to 75%, or 15 to 40%, or 20 to 30%, under pressure (e.g., >1 atm). In one embodiment, the base chemical is infused into the acid-processed *Allium* material to a pH of 0.2 to 6 or, in other embodiments, to a pH of 8-12, to produce a caramelized material having the desired flavor and color. In embodiments, the plant material can be processed using an autoclave, a retort apparatus, a moisture recirculating oven, or other heat-generating, pressurized processing device.

In an embodiment, a caramelization enhancer is added to the base processing to enhance the color and flavor of the finished product. Examples of caramelization enhancers include, but are not limited to, various ammonium and ammonia compounds such as ammonium sulfite, ammonia, and amino acids such as lysine.

The resulting *Allium* material is a caramelized, non-fat, sweetened *Allium* flavoring material which has an increased level of sweetness (i.e., simple sugars) compared to the non-processed, starting *Allium* material, and the organoleptic characteristics associated with caramelized product (e.g., caramelized onions). In embodiments, the caramelized *Allium* flavoring material is a light to medium to dark caramel color.

Examples of suitable base neutralizing compounds include, but are not limited to, sodium bicarbonate, potassium bicarbonate, sodium hydroxide, potassium hydroxide, calcium hydroxide, and magnesium hydroxide. In an embodiment, the base neutralizing component is a dilute aqueous solution, for example, a 3 to 4% aqueous solution (0.4 to 0.5% w/w) of sodium bicarbonate.

Moisture Reduction.

Following the base processing step, in an embodiment, the *Allium* material can be dehydrated to reduce the residual moisture to a shelf-stable moisture content (e.g., 4 to 10%). The dehydrated, moisture-reduced *Allium* material can then be packaged as a flavoring material for storage or shipment.

In an embodiment, the residual moisture can be reduced by dehydrating the processed *Allium* flavoring material using any of a variety of dehydrating devices, as described herein. In an embodiment, drying can be done in stages whereby factors such as the temperature, humidity, air velocity and conveyor rate are controlled according to the moisture content of the plant material.

In an embodiment, the *Allium* flavoring material is produced without the addition of a sweetening agent or sugar.

The process for preparing the sweetened *Allium* flavoring material and/or the caramelized *Allium* flavoring material, can comprise a combination of two or more embodiments described herein.

Composition

The sweetened uncaramelized and/or the caramelized *Allium* flavoring material can be used alone, in combination with other compounds or in composition and used in foods to impart a flavor characteristic of the *Allium*-based material to foods (e.g., sweet onion flavor, sweetened garlic flavor, etc.).

In an embodiment, the invention provides a composition comprising at least:

(A) a processed, non-fat, sweetened, uncaramelized *Allium*-based flavoring material,
(B) an edible carrier or filler, and
(C) optionally, one or more additives, with no component or ingredient of the composition that is or contains fat.

In another embodiment, the composition comprises at least:

(A) a caramelized, processed, non-fat, sweetened *Allium*-based flavoring material,
(B) an edible carrier or filler, and
(C) optionally, one or more additives,
with no component or ingredient that is or contains fat.

In an embodiment, the composition contains no added sweetening agent or sugar.

In an embodiment, the composition is prepared by combining the (A), (B), (C) components to form a blend.

In an embodiment, the composition comprises, based on the total weight of the composition:

(A) 80 to 99.5 wt % of a non-fat, sweetened *Allium*-based flavoring material, processed according to the disclosure;
(B) 0.5 to 20 wt % of an edible carrier; and
(C) 0 to 10 wt % of one or more additives.

In an embodiment, the non-fat, sweet *Allium*-based flavoring material is in a caramelized form.

In an embodiment, the composition has a residual moisture content of 4 to 10%.

In embodiments, the starting *Allium* material is derived from a plant material of a suitable *Allium* species, including, but are not limited to, *Allium cepa* (onion), *Allium sativum* (garlic), *Allium ampeloprasum* (leeks), *Allium cepa* var. *aggregatum* (shallots), *Allium schoenoprasum* (chives), and *Allium fistolosum* (Japanese bunching onions).

The processed *Allium*-based flavoring material can be combined with an edible carrier or filler which does not diminish the quality of the flavor, for example, to add body to the flavoring material. Preferably, the carrier/filler is an inert compound. Examples of carriers/fillers for combining with the processed *Allium*-based flavoring material include, but are not limited to, salt, dextrose, maltodextrin, starch, gum arabic, gum tragacanth, carrageen, cellulose gum, methylcellulose, sodium carboxymethylcellulose, calcium stearate, citric acid, and silicon dioxide (silica).

In embodiments, the composition can optionally include one or more compatible additives. Examples of suitable additives generally include, but are not limited to, antimicrobial agents, bulking agents, flow agents, binding agents, antioxidants, ultraviolet (UV) absorbers and stabilizers, as known and used in the art. In embodiments, the composition can include one or more additives in an amount of 0.1 to 10 wt %, based on the total weight of the composition.

In an embodiment, the *Allium*-based flavoring material is derived from a moisture-reduced *Allium*-based plant material that is processed according to the invention. In embodiments, the *Allium*-based flavoring material is produced by treating a moisture-reduced *Allium*-based plant material with an acid component to hydrolyze a majority of the fructan content of the plant material to simple sugars (glucose, fructose), then treating the material with a base component to neutralize the material.

In an embodiment, processing with the base component is conducted by applying a room temperature solution of the base component to neutralize the acid to a pH of 3 to 8, or 6 to 8, resulting in an uncaramelized, sweetened *Allium*-based flavoring material.

In another embodiment, processing with the base component is conducted at an elevated temperature of 60 to 160° C. to a pH of 0.2 to 6 or, in other embodiments to a pH of 8 to 12, to produce a caramelized, sweetened *Allium*-based flavoring material. In an embodiment, an aqueous solution of a base component is applied to the acid-processed *Allium* material, and the temperature of the material is raised to 60 to 160° C., to a pH of 0.2 to 6 or, in other embodiments to a pH of 8 to 12, to produce a caramelized, sweetened *Allium*-based flavoring material. In an embodiment, a caramelization enhancer is added to the base processed material.

In an embodiment, after processing with the base component, the *Allium* material can be adjusted to a desired pH of 3 to 8.

The Control and Test Samples 1, 2, and 3 were subsequently dehydrated in a pilot forced air dryer (+/−7500 cfm) with the following temperature protocol: 79.5° C. for 30 minutes, 71° C. for 90 minutes and 54.4° C. for 18 hours until residual moisture content was +/−5%.

The Control and Test Samples 1, 2, and 3 were assayed for fructan, D-glucose, D-fructose using a Megazyme Fructan Assay kit and Megazyme D-fructose and D-glucose Assay Kit (commercially available from Megazyme International Ireland Ltd.). The test results are shown in Table 1.

TABLE 1

FRUCTAN AND SUGAR ANALYSES

| SAMPLE # | Process | FRUCTAN CONTENT (% of Non-Structural Carbohydrates) Before | After | SUGAR CONTENT (mg/g) Glu | Fru | Glu + Fru total mg | % Glu + Fru | % increase from Control |
|---|---|---|---|---|---|---|---|---|
| Control | untreated | 53.3 | — | 0.62 | 12.61 | 13.23 | 1.32 | — |
| Ex. 1 (204) | sweetened | 53.3 | 31.95 | 21.47 | 144.26 | 165.73 | 16.57 | 1252.8 |
| Ex. 2 (210-1) | sweetened | 53.3 | 31.88 | 11.21 | 105.93 | 117.14 | 11.71 | 885.5 |
| Ex. 3 (210-2) | sweetened | 53.3 | 32.43 | 7.98 | 77.49 | 85.47 | 8.55 | 646.1 |
| Ex. 4 (204C) | caramelized | 53.3 | 25.11 | 25.05 | 181.52 | 206.57 | 20.66 | 1561.6 |
| Ex. 5 (210C) | caramelized | 53.3 | 32.27 | 12.20 | 135.76 | 147.96 | 14.80 | 1118.5 |

In an embodiment, the processed *Allium* material can then be dehydrated to reduce the residual moisture to a storage stable level, and packaged.

The composition can comprise a combination of two or more embodiments described herein.

Example 1

The following example of an uncaramelized onion flavoring material was prepared according to the invention.

Forty-five (45) kilograms (kg) of large chopped dehydrated onions (variety White Creole) with a 5% residual moisture content and a high fructan content of >50 wt %, based on dry weight of the dried onions, were added to a direct steam injected, steam jacketed horizontal blender (Blentech BT-24030). The Control was a sample of the unprocessed (untreated) dehydrated onion starting material.

Agitators were set to 10 rpm with the following parameters: 30 seconds forward, 5 seconds pause, and 30 seconds reverse. Jacket temperature was set at 90° C. 22.5 liters of 1% sulfuric acid (0.33% w/w) were added to the blender containing the test sample under agitation. Steam was injected into the blender jacket at 25 psi until the product temperature reached 90° C., which took approximately 20 minutes. Blender agitation speed was then reduced to 7 rpm to minimize piece size reduction/agglomeration. After 48 minutes of incubation at 90° C., 10 liters of 3.8% sodium bicarbonate solution (approximately 0.46% w/w) were added into the blender and mixed with the acid-processed sample material (at 90° C.) for approximately 10 minutes until fully absorbed by material. The resulting sweet, golden, product was then ejected from the blender for either direct packaging or subsequent dehydration.

Test results of test samples 1, 2, and 3 indicated approximately 40% of fructan content was converted to simple sugars. The estimate of increased sweetness showed a six (6) to 12-fold increase in reducing sugar or just fructose alone over the starting onion material (Control).

Example 2

The following example of an caramelized onion flavoring material was prepared according to the invention.

Sweetened onion from Example 1 was further processed into caramelized sweet onion by reducing the moisture content from approximately 30% to approximately 15% by heating in conventional oven and raising product temperature to 115° C. (240° F.). At this temperature and moisture content combination, the product vapor pressure was about 1 atm and moisture loss ceased in an environment where the air is water vapor saturated. Moisture was then held constant at 15% during incubation period at 115° C. (240° F.) by sealing the material in a glass vessel. After 30 minutes of incubation, the deeply caramelized material was transferred to a Harvest Saver Dehydrator (Commercial Dehydrator Systems, Inc., Eugene, Oreg.) and dried for approximately 18 hours at 60° C. (140° F.) with recirculation set to 12% relative humidity until residual product moisture content was +/−8%.

Test samples 4 and 5 were assayed for D-glucose, D-fructose using the Megazyme D-fructose and D-glucose Assay Kit. The test results are shown in Table 1.

Test results of samples 4 and 5 in Table 1 indicated approximately 40-50% of initial fructan was converted to simple sugars. The estimate of increased sweetness showed a 13- to 18-fold increase in glucose and fructose content over the starting onion material (Control). In addition to the increased sweetness, the Test samples had the characteristic buttery and nutty organoleptic flavor profile typically associated with caramelized onions.

It is specifically intended that the present invention not be limited to the embodiments and illustrations contained herein, but include modified forms of those embodiments including portions of the embodiments and combinations of elements of different embodiments as come within the scope of the following claims.

We claim:

1. A process for preparing a non-fat, sweetened *Allium* flavoring material, comprising:
   a) reducing a moisture content of an *Allium* material having (i) a high soluble solids content (SSC) of at least 8% and (ii) an initial fructan content, to a residual moisture content of less than 50% by dehydrating the *Allium* material to form a reduced moisture *Allium* material;
   b) mixing the reduced moisture *Allium* material with an acid component selected from the group consisting of (i) an aqueous solution of an inorganic acid selected from the group consisting of sulfuric acid, hydrochloric acid, phosphoric acid, nitric acid, and mixtures thereof; and (ii) an aqueous solution of an organic acid selected from the group consisting of citric acid, acetic acid, formic acid, propionic acid, butyric acid, valeric acid, caproic acid, lactic acid, malic acid, benzoic acid, carbonic acid, and mixtures thereof, at a temperature of 60 to 160° C. to produce an acid-processed *Allium* material having a processed fructan content that is at least 20% less than the initial fructan content; and
   c) mixing the acid-processed *Allium* material with a base compound selected from the group consisting of sodium bicarbonate, potassium bicarbonate, sodium hydroxide, potassium hydroxide, calcium hydroxide, magnesium hydroxide, sodium bicarbonate, and potassium bicarbonate, and mixtures thereof, to a pH selected from the group consisting of (i) from 3 to 8, (ii) from 8 to 12, and (iii) from 0.2 to 6, to produce the *Allium* flavoring material;
   wherein
   the *Allium* material is processed without the addition of a fat or oil material or component; and
   the processed *Allium* flavoring material has an increased concentration of glucose and fructose compared to the same *Allium* material which is not processed according to steps a, b and c.

2. The process of claim 1, further comprising, prior to step a), reducing the size of the *Allium* material into pieces or fragments.

3. The process of claim 1, wherein step b) is conducted by mixing the reduced moisture *Allium* material with the acid component, at a temperature of 60 to 160° C., while maintaining a moisture content of the acid-processed *Allium* material at 10 to 75%.

4. The process of claim 3, wherein step b) is conducted while maintaining the moisture content of the material at 20% to 30%.

5. The process of claim 1, wherein step c) is conducted by mixing the acid-processed *Allium* material with the base compound to a pH of 3 to 8 to produce a non-caramelized *Allium* material.

6. The process of claim 1, wherein step c) is conducted by mixing the acid-processed *Allium* material with the base compound to produce a caramelized *Allium* material.

7. The process of claim 6, wherein step c) comprises mixing the acid-processed *Allium* material with the base compound, and heating the acid-processed *Allium* material to a temperature of 60 to 160° C.

8. The process of claim 7, wherein step c) comprises mixing the acid-processed *Allium* material with the base compound to a pH of 0.2 to 6.

9. The process of claim 7, wherein step c) comprises mixing the acid-processed *Allium* material with the base compound to a pH of 8 to 12.

10. The process of claim 7, wherein step c) is conducted under a pressure of >1 atm.

11. The process of claim 7, wherein step c) comprises mixing the acid-processed *Allium* material with the base compound while maintaining a moisture content of the acid-processed *Allium* material at 10% to 75%.

12. The process of claim 11, wherein step c) is conducted while maintaining the moisture content of the acid-processed *Allium* material at 20% to 30%.

13. The process of claim 6, further comprising adding a caramelization enhancer to the acid-processed *Allium* material and the base compound.

14. The process of claim 1, further comprising, after step c), reducing the moisture content of the processed *Allium* flavoring material, by dehydration, to a shelf-stable moisture content.

15. The process of claim 14, wherein the moisture content is 4 to 6%.

16. The process of claim 1, wherein the *Allium* material is derived from a plant material of an *Allium* species selected from the group consisting of *Allium cepa* (onion), *Allium sativum* (garlic), *Allium ampeloprasum* (leeks), *Allium cepa* var. *aggregatum* (shallots), and *Allium schoenoprasum* (chives).

17. The process of claim 1 further comprising the step of
   (d) adjusting the *Allium* flavoring material to a pH of 3 to 8.

18. The process of claim 1, wherein step b) is conducted by mixing the reduced moisture *Allium* material with the acid component, at a temperature of 60 to 160° C., under a pressure of greater than 1 atm, while maintaining a moisture content of the acid-processed *Allium* material at 10 to 75%.

* * * * *